United States Patent
Milley (10) Patent No.: US 10,458,828 B2
(45) Date of Patent: Oct. 29, 2019

(54) FLOW SENSOR HEATER CIRCUIT CALIBRATION

(71) Applicant: Honeywell International Inc., Morris Plains, NJ (US)

(72) Inventor: Andrew J Milley, Roswel, GA (US)

(73) Assignee: Honeywell International Inc., Morris Plains, NJ (US)

( * ) Notice: Subject to any disclaimer, the term of this patent is extended or adjusted under 35 U.S.C. 154(b) by 177 days.

(21) Appl. No.: 15/426,516

(22) Filed: Feb. 7, 2017

(65) Prior Publication Data

US 2018/0224308 A1  Aug. 9, 2018

(51) Int. Cl.
*G01F 1/696* (2006.01)
*G01F 1/692* (2006.01)
*G01F 25/00* (2006.01)

(52) U.S. Cl.
CPC .............. *G01F 1/696* (2013.01); *G01F 1/692* (2013.01); *G01F 25/0007* (2013.01)

(58) Field of Classification Search
CPC . G01F 1/69; G01F 1/696; G01F 1/692; G01F 25/0007
USPC ...................... 73/202–204.27, 708, 721, 727
See application file for complete search history.

(56) References Cited

U.S. PATENT DOCUMENTS

| | | | | |
|---|---|---|---|---|
| 4,264,961 A * | 4/1981 | Nishimura | ............ | F02D 41/187 123/494 |
| 4,345,477 A * | 8/1982 | Johnson | ................ | G01L 1/2281 257/419 |
| 4,658,651 A * | 4/1987 | Le | .......... | G01L 1/2293 29/621.1 |
| 5,753,815 A * | 5/1998 | Murata | .................... | G01F 1/698 73/204.15 |
| 5,827,960 A * | 10/1998 | Sultan | ..................... | G01F 1/684 73/204.26 |
| 7,555,829 B2 | 7/2009 | Grudin et al. | | |
| 7,891,869 B2 | 2/2011 | Takeuchi | | |
| 8,650,947 B2* | 2/2014 | Lopez | .................. | G01F 1/6842 73/204.27 |
| 2004/0002821 A1* | 1/2004 | Kanke | ................... | G01F 1/6845 702/45 |
| 2008/0236273 A1* | 10/2008 | Dmytriw | .................. | G01F 1/69 73/204.17 |
| 2009/0164163 A1* | 6/2009 | Wang | .................... | G01F 1/6845 702/100 |

(Continued)

*Primary Examiner* — Randy W Gibson
*Assistant Examiner* — Gedeon M Kidanu
(74) *Attorney, Agent, or Firm* — Seager, Tufte & Wickhem LLP (57) ABSTRACT

A heater control circuit in a fluid flow sensor. The circuit comprises first, second, and third resistors, a heater resistor, a trimmable resistor, and a switch. A positive terminal of the first resistor is connected to a positive terminal of the trimmable resistor, a negative terminal of the first resistor is connected to a positive terminal of the heater resistor, a negative terminal of the trimmable resistor is connected to a positive terminal of the second resistor, a negative terminal of the second resistor is connected to a positive terminal of the third resistor, and a negative terminal of the heater resistor is connected to a negative terminal of the third resistor, the terminals of the second resistor are attached to the terminals of the switch, where the switch is configured closed in a calibration mode and configured open in a flow sensing mode.

17 Claims, 5 Drawing Sheets

(56) References Cited

U.S. PATENT DOCUMENTS

2014/0130605 A1* 5/2014 Milley .................... G01D 3/02
                                                    73/861
2016/0109315 A1* 4/2016 Nguyen ................ G01L 13/025
                                                    73/708

* cited by examiner

FLOW SENSOR HEATER CIRCUIT CALIBRATION

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Flow sensors are used to sense fluid flow, and in some cases, provide flow signals that can be used for instrumentation and/or control. Flow sensors are used in a wide variety of applications including industrial applications, medical applications, engine control applications, military applications, and aeronautical applications, to name just a few. Technical innovation in design and manufacturing of flow sensors may be directed to reducing the size and/or increasing the accuracy of flow sensors.

SUMMARY

In an embodiment, a heater control circuit for a thermal transfer based fluid flow sensor is disclosed. The heater control circuit comprises a first resistor, a heater resistor, a trimmable resistor, a second resistor, and a third resistor. A positive terminal of the first resistor is connected to a positive terminal of the trimmable resistor, a negative terminal of the first resistor is connected to a positive terminal of the heater resistor, a negative terminal of the trimmable resistor is connected to a positive terminal of the second resistor, a negative terminal of the second resistor is connected to a positive terminal of the third resistor, and a negative terminal of the heater resistor is connected to a negative terminal of the third resistor. The heater control circuit further comprises a first electronic switch where a positive terminal of the first electronic switch is connected to the positive terminal of the second resistor and a negative terminal of the first electronic switch is connected to the negative terminal of the second resistor, where the first electronic switch is configured closed and provides a short circuit bypassing the third resistor when the heater control circuit is operated in a calibration mode and where the first electronic switch is configured open when the heater control circuit is operated in a flow sensing mode.

In another embodiment, a fluid flow sensor is disclosed. The fluid flow sensor comprises a microelectromechanical system (MEMS) semiconductor chip, a heater control circuit, and a first electronic switch. The MEMS semiconductor chip comprises an upstream flow sensor resistor, a downstream flow sensor resistor, and a heater resistor disposed between the upstream flow sensor resistor and the downstream flow sensor resistor. The heater control circuit comprises a first resistor, a trimmable resistor, a second resistor, and a third resistor. A positive terminal of the first resistor is connected to a positive terminal of the trimmable resistor, a negative terminal of the first resistor is connected to a positive terminal of the heater resistor, a negative terminal of the trimmable resistor is connected to a positive terminal of the second resistor, a negative terminal of the second resistor is connected to a positive terminal of the third resistor, and a negative terminal of the heater resistor is connected to a negative terminal of the third resistor. A positive terminal of the first electronic switch is connected to the positive terminal of the second resistor and a negative terminal of the first electronic switch is connected to the negative terminal of the second resistor, where the first electronic switch is configured closed and provides a short circuit bypassing the third resistor when the heater control circuit is operated in a calibration mode and where the first electronic switch is configured open when the first electronic switch is operated in a flow sensing mode.

In yet another embodiment, a method of manufacturing a fluid flow sensor is disclosed. The method comprises manufacturing a fluid flow sensor package, where the package comprises a microelectromechanical system (MEMS) semiconductor chip comprising an upstream flow sensor resistor, a downstream flow sensor resistor, and a heater resistor disposed between the upstream flow sensor resistor and the downstream flow sensor resistor and a heater control circuit, connected to the MEMS semiconductor chip, comprising a trimmable resistor. The method further comprises electrically configuring the fluid flow sensor package to a calibration mode of operation, determining a voltage difference across a calibration Wheatstone bridge formed by the fluid flow sensor package in the calibration mode of operation, and adjusting the resistance of the trimmable resistor based on the voltage difference across the calibration Wheatstone bridge.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The present disclosure teaches a flow sensor heater control circuit that promotes calibration of the heater control circuit after encapsulating flow sensor components, including the heater control circuit, in a package. The flow sensor features a plurality of temperature sensitive resistors in a first Wheatstone bridge configuration. A heater located physically between the two legs of the first Wheatstone bridge configuration heats fluid passing over the flow sensor and induces a temperature difference between the two legs of the first Wheatstone bridge—and hence an electrical imbalance that results in a voltage across the first Wheatstone bridge that is an indication of the rate of fluid flow—that is greater or lesser as the rate of fluid flow is faster or slower. The accuracy of the flow sensor output is best when the temperature of the heater is maintained at a substantially constant predefined temperature delta higher than the temperature of the fluid. The heater control circuit adapts the temperature of the heater based on the temperature of the fluid, whereby to maintain the predefined temperature delta between the heater and the fluid substantially constant.

The predefined temperature delta of the heater may be controlled, in part, by the resistance value of a trimmable resistor in the heater control circuit taught by the present disclosure. For example, a gross heater temperature control resistor may be selected and built into the heater control circuit to adapt the temperature of the heater to about the design temperature delta or predefined temperature delta specified for the given flow sensor product. The trimmable resistor can be used to make fine adjustments to the heater temperature delta relative to the temperature of the fluid after the flow sensor package has been assembled.

In the process of manufacturing a flow sensor, manufacturing and/or tolerance differences may lead to variations in the heater control circuit that can be compensated for at the end of the manufacturing process by adjusting the trimmable resistor. These variances can result from variances in component parts, such as variation in the resistance value of the gross heater temperature control resistor built into the flow sensor package, variation in the packaging process itself, and variations in electrical properties of other components of the flow sensor package. The heater control circuit of the present disclosure comprises electronic switches that may be controlled to place the heater control circuit in a calibration mode of operation and controlled to return the heater control circuit to a flow sensing mode of operation. The heater control circuit in combination with the calibration features such as the electronic switches may be referred to in some contexts as a heater calibration circuit. When the electronic switches of the heater control circuit are configured to a calibration mode, a second Wheatstone bridge configuration is formed in part of the heater control circuit. When the trimmable resistor is properly trimmed or adjusted, the voltage difference across this second Wheatstone bridge portion of the heater control circuit is zero (the second Wheatstone bridge is said to be "balanced"). The trimmable resistor may be a thin film resistor located on an externally accessible portion of the flow sensor package and may be trimmed using a laser. Alternatively, the trimmable resistor may be a digital potentiometer and may be set with a digital control value.

Figure 1:
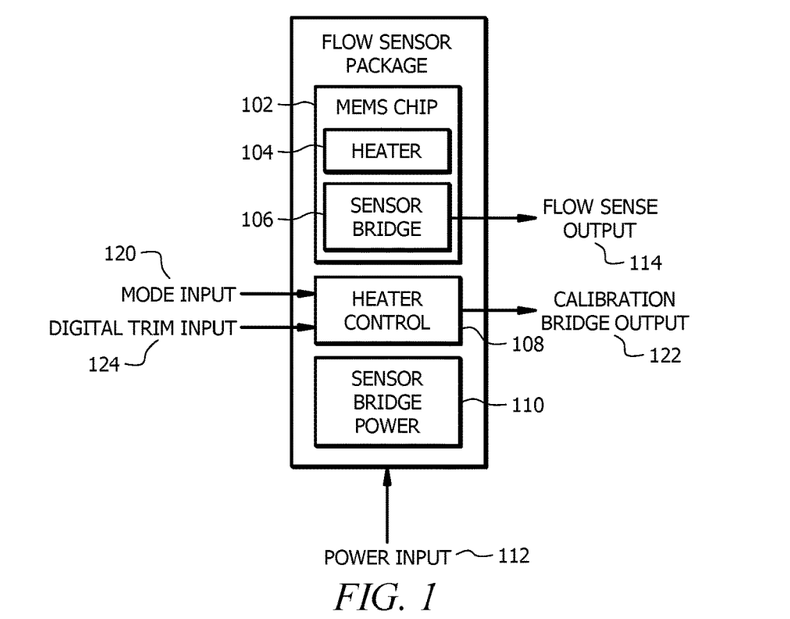
FIG. 1 is a block diagram of a flow sensor package according to an embodiment of the disclosure.

Turning now to FIG. 1, a flow sensor 100 is described. In an embodiment, the flow sensor 100 comprises a microelectromechanical system (MEMS) chip 102 that comprises a heater 104 and a flow sensor bridge 106. The flow sensor 100 further comprises a heater control circuit 108 and a sensor bridge power circuit 110. It is understood that the heater 104 may be considered to be a portion of the heater control circuit 108, notwithstanding that it is provided on the MEMS chip 102. The flow sensor 100 may receive a power input 112. The flow sensor bridge 106 may output a flow sense output 114. The heater control circuit 108 comprises an operation mode input 120, an optional digital trim input 124, and a calibration bridge output 122. It is understood that the teachings of the present disclosure may be embodied in a flow sensor 100 as described with reference to FIG. 1, but in another embodiment the flow sensor 100 may be different. For example, in an embodiment the heater control circuit 108 and/or the sensor bridge power circuit 110 may be incorporated into the MEMS chip 102, along with the heater 104 and the flow sensor bridge 106.

The flow sensor 100 may be manufactured by attaching the MEMS chip 102, the heater control circuit 108, and the sensor bridge power circuit 110 to a substrate or other mechanical supporting structure and then encapsulated with a material such as plastic, epoxy, ceramic, or other packaging material. It is understood that appropriate wire connections among the MEMS chip 102, the heater control circuit 108, and sensor bridge power circuit 110 and external wire leads to the package 100 are established prior to encapsulation. After encapsulation, a trimmable resistor in the heater control circuit 108 may be trimmed or adjusted to calibrate the flow sensor 100 to establish a predefined temperature delta, during flow sensing mode of operation, between the heater 104 and the fluid whose flow is to be sensed. The mode input 120 may be set to calibration mode, the calibration bridge output 122 may be monitored, and the digital trim input 124 may be adjusted to zero the heater bridge output 122, which is the condition for proper calibration of the heater control circuit 108. Alternatively, the trimmable resistor may be a thin film resistor accessible from an exterior of the flow sensor 100, and the trimmable resistor may be trimmed or adjusted with a laser until the calibration bridge output 122 is zero.

It is contemplated that the flow sensor 100 may be used in a variety of different flow sensing applications, including but not limited to, sensing temperature of a fluid in a flue, for example temperature of air, oxygen, nitrogen, CO2, or natural gas. The flow sensor 100 may be used to sense temperature of a fluid such as water, oil. The flow sensor 100 may be used to sense temperature in a bleed air system of an aircraft engine, in an air intake system of an engine, in a feed line of a chemical processing plant, or other. In an embodiment, the MEMS chip 102 may have an about 4 mm square area, an about 1 mm square area, an about ¼ mm square area, or other. In an embodiment, the flow sensor 100 may be about 1 cubic inch in volume or smaller. It is understood, however, that the MEMS chip 102 may have other sizes and the flow sensor 100 may have other sizes.

Figure 2:
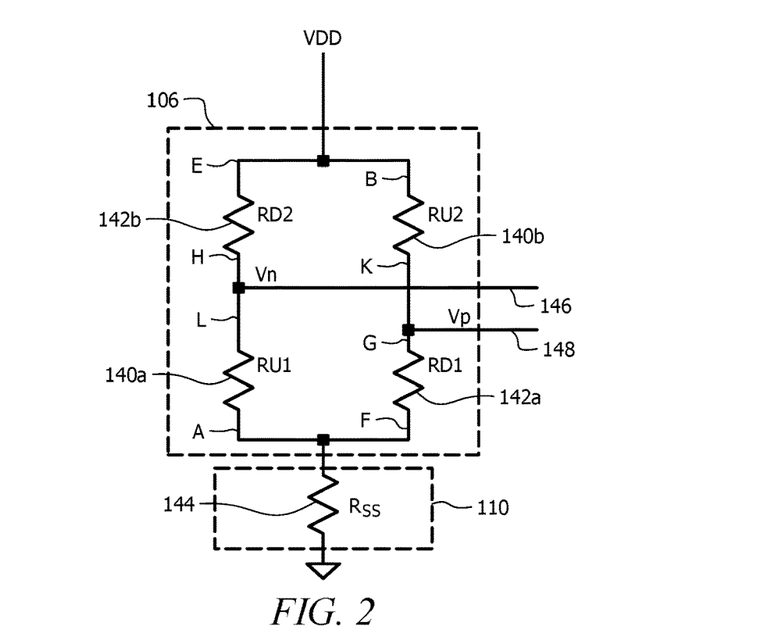
FIG. 2 is an electrical schematic of a flow sensing circuit according to an embodiment of the disclosure.

Turning now to FIG. 2, a flow sensor bridge 106 is described. In an embodiment, the flow sensor bridge 106 comprises two upstream resistors $RU_1$ 140a and $RU_2$ 140b and two downstream resistors $RD_1$ 142a and $RD_2$ 142b. The second downstream resistor $RD_2$ 142b and the first upstream resistor $RU_1$ 140a form a first leg of a flow sensor Wheatstone bridge and the second upstream resistor $RU_2$ 140b and the first downstream resistor $RD_1$ 142a form a second leg of the flow sensor Wheatstone bridge. A voltage $V_{DD}$ is applied at one end of the flow sensor Wheatstone bridge and the flow sensor Wheatstone bridge is grounded through a resistor $R_{SS}$ 144. The resistor $R_{SS}$ 144 may limit the current flow through the resistors 140a, 140b, 142a, 142b. In an embodiment, not wishing to be limited by theory, the resistor $R_{SS}$ 144 may stabilize a voltage across the flow sensor Wheatstone bridge as fluid temperature varies and hence some of the resistances in the flow sensor Wheatstone bridge change. In some contexts the resistor $R_{SS}$ 144 may be referred to as a sensor Wheatstone bridge stabilization resistor. Also, the resistor $R_{SS}$ 144 may constitute or implement the sensor bridge power circuit 110.

The resistors 140a, 140b, 142a, 142b may be temperature sensitive resistors (e.g., may have a high temperature coefficient of resistance). As a temperature difference is established between the upstream resistors 140a, 140b and the downstream resistors 142a, 142b (for example, a temperature difference induced by the heater 104 heating the fluid flowing over the flow sensor bridge 106), a voltage difference develops between Vn 146 and Vp 148 which is an indication of the rate of fluid flow. The voltage difference Vn 146 to Vp 148 may be provided as the flow sense output 114 of FIG. 1.

Figure 3:
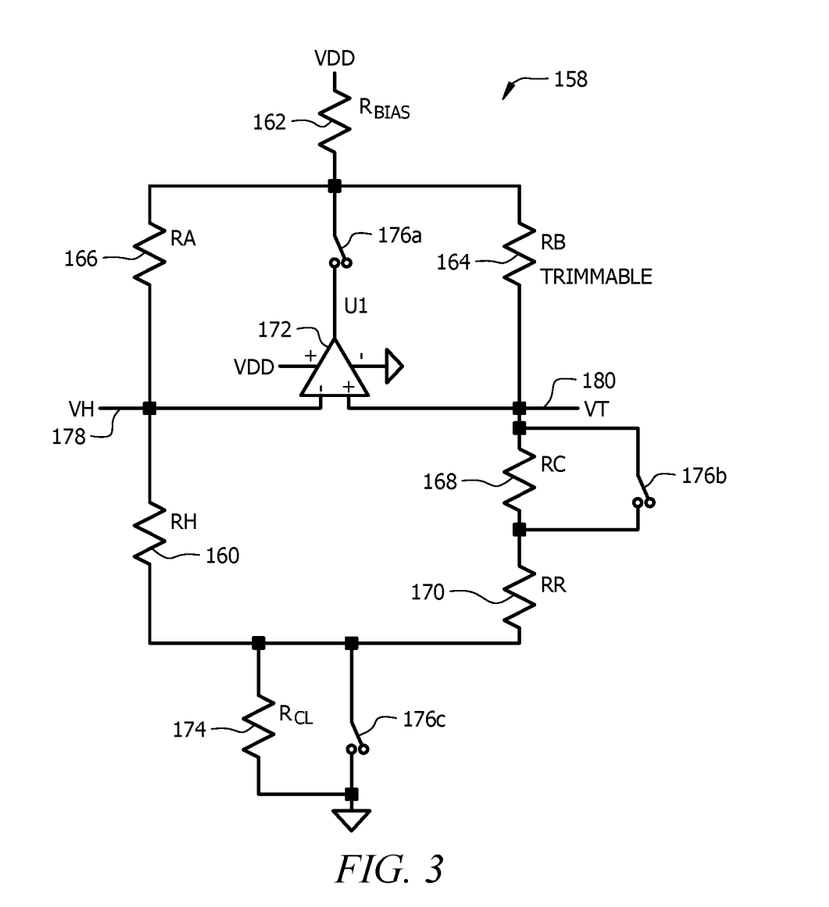
FIG. 3 is an electrical schematic of a heater control circuit according to an embodiment of the disclosure.

Turning now to FIG. 3, a heater control circuit 158 is described. In an embodiment, the heater control circuit 158 comprises a heater resistor $R_H$ 160, a trimmable resistor $R_B$ 164, a first resistor $R_A$ 166, a second resistor $R_C$ 168, a third resistor $R_R$ 170, a fourth resistor $R_{CL}$ 174, and a fifth resistor $R_{BIAS}$ 162. The heater resistor $R_H$ 160 is identical with the heater 104 illustrated and described with reference to FIG. 1. It is remarked that the heater 104 can be considered to be a part of the heater control circuit 158 notwithstanding that it is provided on the MEMS chip 102. The heater control circuit 158 further comprises a first electronic switch 176b, a second electronic switch 176a, and a third electronic switch 176c. The heater control circuit 158 further comprises an operational amplifier 172. The electronic switches 176 may be implemented as field effect transistors (FETs) or as another kind of electronic switch. The trimmable resistor $R_B$ 164 may be a digital potentiometer or a thin film resistor. If the trimmable resistor $R_B$ 164 is embodied as a thin film resistor, the first resistor $R_A$ 166 may also be implemented as a thin film resistor. The heater control circuit 158 further comprises a fifth resistor $R_{BIAS}$ 162 and a fourth resistor $R_{CL}$ 174. In an embodiment, the heater resistor $R_H$ 160 and the third resistor $R_R$ 170 are located in the MEMS chip 102.

The heater control circuit 158 receives the mode input 120 that controls the state of the electronic switches 176. When the mode input 120 commands a calibration mode of operation, the first electronic switch 176b is closed and the second electronic switch 176a and the third switch 176c are open. When the mode input 120 commands a flow sensing mode of operation, the first electronic switch 176b is open and the second electronic switch 176a and the third switch 176c are closed. As is understood by one skilled in the art, an open switch presents an open circuit (e.g., no conduction path, presenting infinite or very high electrical resistance) and a closed switch presents a short circuit (e.g., a conduction path, presenting zero or very little electrical resistance).

The resistance value of the fifth resistor $R_{BIAS}$ 162 depends on the supply voltage $V_{DD}$ and possibly other circuit factors, and is predefined so as to bias the operational amplifier 172 to balance desirably between driving high and driving low. In an embodiment the supply voltage $V_{DD}$ may be about 5 volts. Alternatively the supply voltage $V_{DD}$ may be about 3 volts. Alternatively the supply voltage $V_{DD}$ may be about 20 volts. In another embodiment, a different value for the supply voltage $V_{DD}$ may be used.

The resistance value of the fourth resistor $R_{CL}$ 174 is high relative to the resistance of other resistors in the heater control circuit 158, which has the purpose of limiting total current that can flow in a heater calibration Wheatstone bridge during the calibration mode of operation. The value of the second resistor $R_C$ 168 determines the base level of heat that the heater resistor $R_H$ 160 delivers during a flow sensing mode of operation. In an embodiment, the first resistor $R_A$ 166 may be about 100 Ohms, the second resistor $R_C$ 168 may be about 475 Ohms, the fifth resistor $R_{BIAS}$ 162 may be about 909 Ohms, the fourth resistor $R_{CL}$ 174 may be about 100K Ohms, and the trimmable resistor $R_B$ 164 may be about 650 Ohms, but in another embodiment different values of resistances may be employed. When the trimmable resistor $R_B$ 164 is a digital potentiometer, the resistance value of trimmable resistor $R_B$ 164 may extend across a range of resistances, for example from less than 100 Ohms to more than 2K Ohms. When the trimmable resistor $R_B$ 164 is a thin film resistor, the trimmable resistor $R_B$ 164 may start with a relatively low resistance, for example about the same resistance as $R_A$ 166 (e.g., about 100 Ohms), and the resistance of $R_B$ 164 may be increased as desired by laser trimming to balance the heater calibration Wheatstone bridge during the calibration mode of operation.

Figure 4:
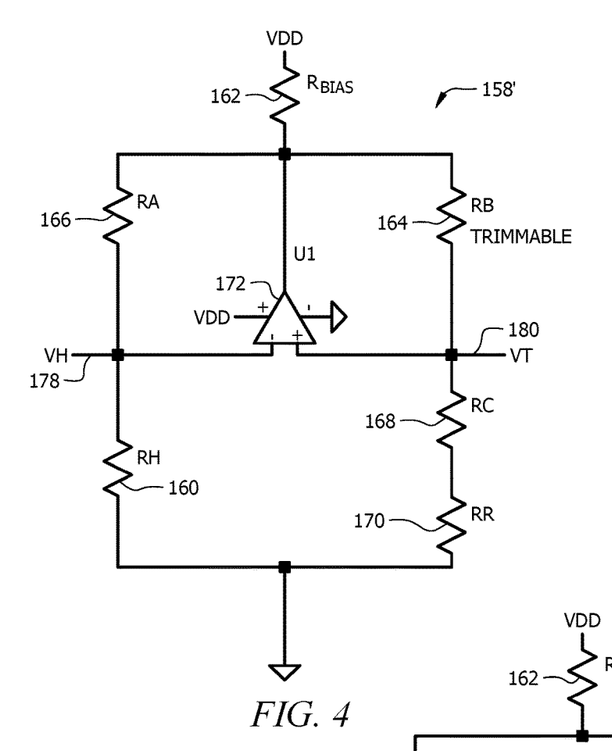
FIG. 4 is an electrical schematic of a heater control circuit during a flow sensing operation mode according to an embodiment of the disclosure.

Turning now to FIG. 4, the heater control circuit 158 is illustrated as configured in the flow sensing mode of operation, indicated by referring to circuit 158'. It is understood that the switches 176 and fourth resistor $R_{CL}$ 174 are still present in the heater control circuit 158 but are removed from the illustration of FIG. 4 to simplify discussion of the flow sensing mode of operation of the heater control circuit 158. Note that the first electronic switch 176b, which is open in the flow sensing mode of operation, is omitted from FIG. 4 as being irrelevant to the flow sensing mode of operation; the third switch 176c which is closed and the shorted out fourth resistor $R_{CL}$ 174 are likewise omitted from FIG. 4, because the fourth resistor $R_{CL}$ 174 is irrelevant to the flow sensing mode of operation; the second electronic switch 176c which is closed, thereby enabling the operational amplifier 172, is omitted from FIG. 4, replaced with the conduction path.

In the simplified illustration of the heater control circuit 158 configured in the flow sensing mode of operation, the operational amplifier 172 holds the voltage of $V_H$ 178 and $V_T$ 180 to equal values. The resistance of the second resistor $R_C$ 168 may be said to perform the role of setting the gross heat output level of the heater resistor 160. The second resistor $R_C$ 168 may be referred to as a gross heater temperature control resistor in some contexts. The trimmable resistor $R_B$ 164 provides fine adjustment of heater temperature control.

Figure 5:
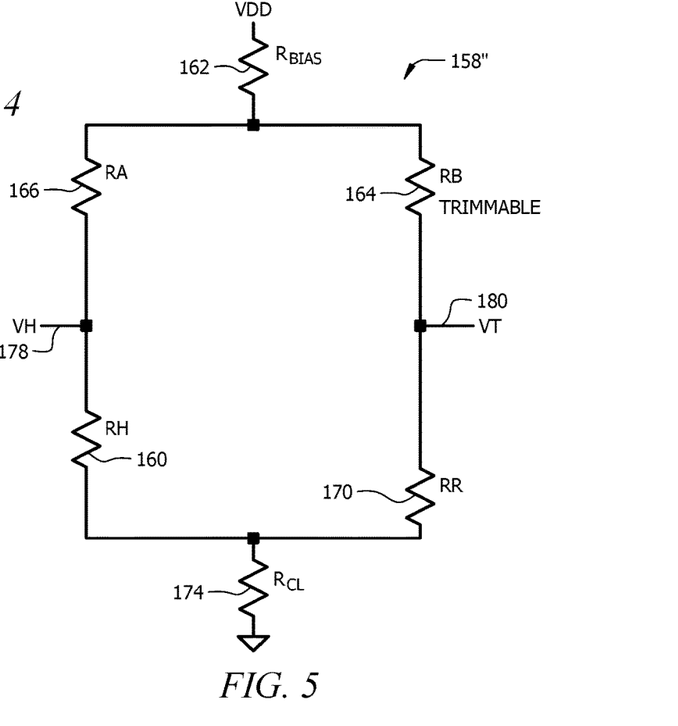
FIG. 5 is an electrical schematic of a heater control circuit during a calibration mode according to an embodiment of the disclosure.

Turning now to FIG. 5, the heater control circuit 158 is illustrated as configured in the calibration mode of operation, indicated by referring to circuit 158". It is understood that the switches 176, the operational amplifier 172, and the second resistor $R_C$ 168 are still present in the heater control circuit 158 but are removed from the illustration of FIG. 5 to simplify discussion of the calibration mode of operation of the heater control circuit 158. Note that first electronic switch 176b, which is closed in the calibration mode of operation is omitted from FIG. 5 and replaced with a conduction path; the second resistor $R_C$ 168 is removed as irrelevant since its two terminals are shorted over the first electronic switch 176b that is closed; the operational amplifier 172 is removed from the circuit because it is neutralized by opening the second electronic switch 176a; and the third switch 176c is removed because it is open and irrelevant to the operation of the heater control circuit 158 in the calibration mode of operation.

In the calibration mode of operation of the heater control circuit 158, the fourth resistor $R_{CL}$ 174 limits the total current that flows in the calibration Wheatstone bridge (e.g., the first resistor $R_A$ 166, the heater resistor $R_H$ 160, the trimmable resistor $R_B$ 164, and the third resistor $R_R$ 170), whereby to avoid heating the resistors in the calibration Wheatstone bridge and therefore to keep the resistance values stable during calibration. In an embodiment, the resistance of the fourth resistor $R_{CL}$ 174 may be about 100K Ohms, but in other embodiments the resistance may be different. When the $V_{DD}$ voltage is supplied across the heater control circuit 158 in the calibration mode of operation, the calibration Wheatstone bridge is balanced (e.g., the voltage different between $V_H$ 178 and $V_T$ 180 is about zero) if $R_B = (R_A \times R_R)/R_H$. Said in words, the calibration Wheatstone bridge is balanced when the resistance of the trimmable resistor $R_B$ 164 equals the product of the resistance of the first resistor $R_A$ 166 multiplied by the resistance of the third resistor $R_R$ 170 divided by the resistance of the heater resistor $R_H$ 160. Because the heater control circuit 158 and hence the heater 104 are properly calibrated when the calibration Wheatstone bridge is balanced, the trimmable resistor $R_B$ 164 is desirably trimmed during the calibration mode of operation of the heater control circuit 158 to cause the voltage difference between $V_H$ 178 and $V_T$ 180 is about zero. It is understood that the voltage difference between $V_H$ 178 and $V_T$ 180 may be identical to the calibration bridge output 122 described above with reference to FIG. 1.

Figure 6:
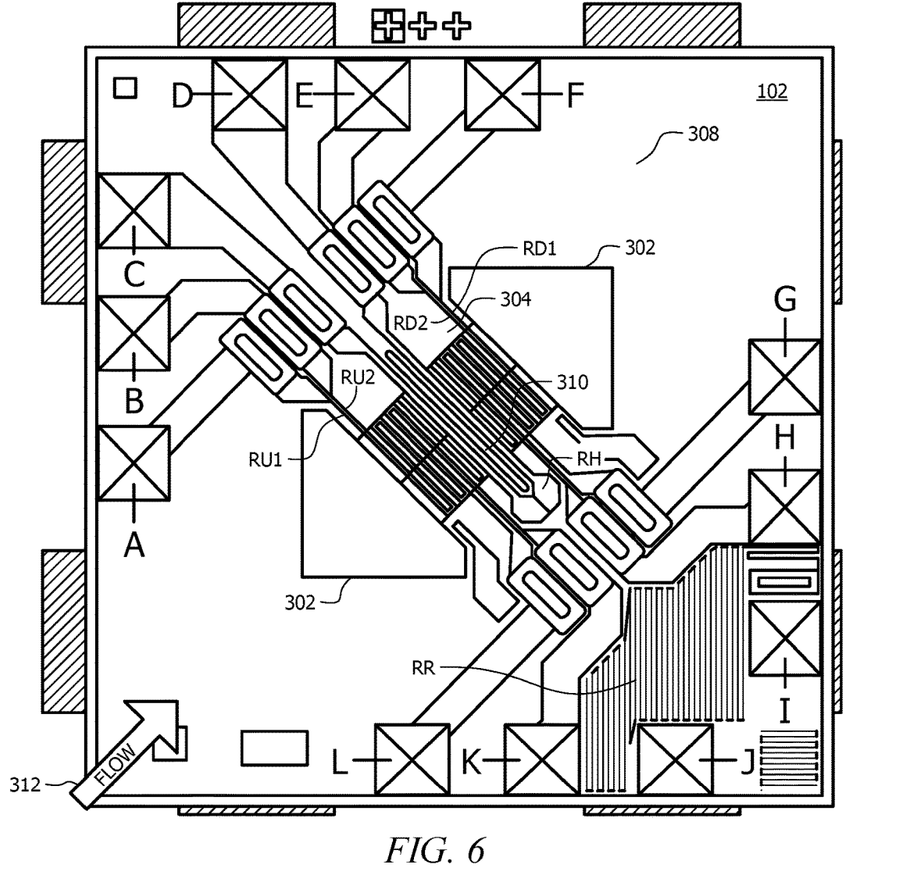
FIG. 6 is an illustration of a microelectromechanical system (MEMS) chip according to an embodiment of the disclosure.

Turning now to FIG. 6, further details of the MEMS chip 102 are discussed. In an embodiment, the MEMS chip 102 may be similar to the illustration of FIG. 6, but in other embodiments the MEMS chip 102 may be different from the illustration of FIG. 6. FIG. 6 is a top view of the MEMS chip 102. In some contexts, the MEMS chip 102 may referred to as a flow sensor die. The MEMS chip has an etched cavity 302 that extends under a membrane 304. The etched cavity 302 helps to thermally isolate the membrane 304 from the substrate 308 of the MEMS chip 102. The example MEMS chip 102 includes a slit 310 through the membrane 304 that extends transversely across the membrane 304. During use, the MEMS chip 102 is positioned in a flow channel.

To help explain the operation of the MEMS chip 102, it is assumed that fluid flows over the MEMS chip 102 in the direction indicated by arrow 312. When so provided, the two upstream resistive elements RU1 and RU2 are positioned on the membrane 304 upstream of the slit 310, and the two downstream resistive elements RD1 and RD2 are positioned on the membrane 304 downstream of the slit 310. The heater resistor $R_H$ 160 is positioned between the upstream resistive elements RU1 and RU2 and the downstream resistive elements RD1 and RD2. In the example shown, the heater resistor $R_H$ includes two legs connected in series, with one leg positioned on either side of the slit 310.

Figure 7:
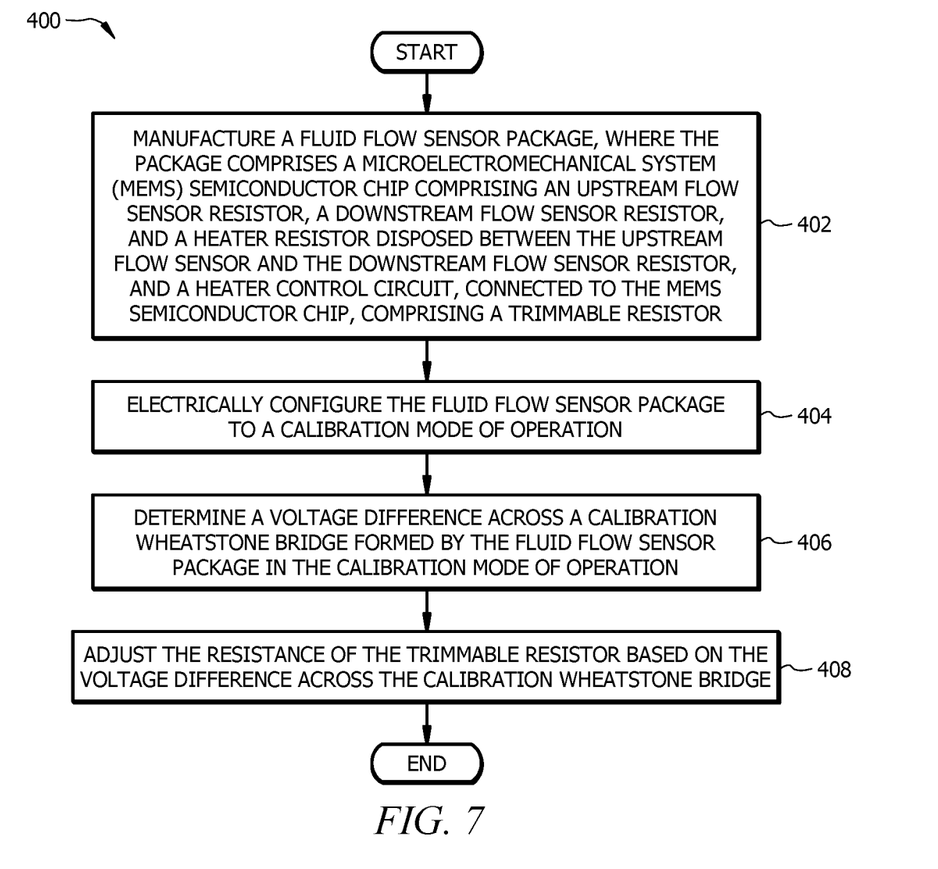
FIG. 7 is a flow chart of a method according to an embodiment of the disclosure.

Turning now to FIG. 7, a method 400 is described. At block 402, a fluid flow sensor package is manufactured. The MEMS semiconductor chip comprises an upstream flow sensor resistor, a downstream flow sensor resistor, and a heater resistor disposed between the upstream flow sensor and the downstream flow sensor resistor. The heater control circuit, connected to the MEMS semiconductor chip, comprises a trimmable resistor. For example, the flow sensor 100 described above with reference to FIG. 1, FIG. 2, FIG. 3, FIG. 4, FIG. 5, and FIG. 6 is manufactured. The sensor package comprises a microelectromechanical system (MEMS) semiconductor chip and a heater control circuit. At block 404, the fluid flow sensor package is electrically configured to a calibration mode of operation. For example, a logic high value is applied to the mode input 120 of the flow sensor 100. Alternatively, a logic low value is applied to the mode input 120 of the flow sensor 100. At block 406, a voltage difference is determined across a calibration Wheatstone bridge formed by the fluid flow sensor package in the calibration mode of operation. For example, the voltage difference is determined at the calibration bridge output 122 of the flow sensor 100. At block 408, the resistance of the trimmable resistor is adjusted based on the voltage difference across the calibration Wheatstone bridge. For example, in an embodiment, the digital trim input 124 of the flow sensor 100 is given values to control the resistance value of a digital potentiometer implementation of the trimmable resistor. When the voltage difference across the calibration Wheatstone bridge is at or close to zero volts, the setting of the trimmable resistor is fixed, for example burned into an internal register of the flow sensor package. Alternatively, in an embodiment, the trimmable resistor is a thin film resistor and the trimmable resistor is adjusted by laser trimming process while monitoring the output of the voltage difference across the calibration Wheatstone bridge. When the output of the voltage difference across the calibration Wheatstone bridge is at or close to zero volts, the laser trimming process is stopped.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A heater control circuit for a thermal transfer based fluid flow sensor for maintaining a constant temperature differential, comprising:
    a first resistor;
    a heater resistor configured to be disposed between the upstream resistive elements and the downstream resistive elements of a flow sensing bridge;
    a trimmable resistor;
    a second resistor;
    a third resistor, wherein
        a positive terminal of the first resistor is connected to a positive terminal of the trimmable resistor,
        a negative terminal of the first resistor is connected to a positive terminal of the heater resistor,
        a negative terminal of the trimmable resistor is connected to a positive terminal of the second resistor,
        a negative terminal of the second resistor is connected to a positive terminal of the third resistor, and a negative terminal of the heater resistor is connected to a negative terminal of the third resistor;
a first electronic switch comprising a positive terminal of the first electronic switch is connected to the positive terminal of the second resistor and a negative terminal of the first electronic switch is connected to the negative terminal of the second resistor, wherein the first electronic switch is configured closed and provides a short circuit bypassing the second resistor when the heater control circuit is operated in a calibration mode wherein the first electronic switch is configured open when the heater control circuit is operated in a flow sensing mode.

2. The heater control circuit of claim 1, further comprising:
a second electronic switch wherein a positive terminal of the second electronic switch is connected to the positive terminal of the first resistor; and
an operational amplifier, wherein a negative input terminal of the operational amplifier is connected to the negative terminal of the first resistor, wherein a positive input terminal of the operational amplifier is connected to the negative terminal of the trimmable resistor, and wherein an output terminal of the operational amplifier is connected to the negative terminal of the second electronic switch,
wherein the second electronic switch is configured open and neutralizes the operational amplifier when the heater control circuit is operated in the calibration mode and wherein the second electronic switch is configured closed when the heater control circuit is operated in a flow sensing mode.

3. The heater control circuit of claim 1, further comprising a fifth resistor wherein a negative terminal of the fifth resistor is connected to the positive terminal of the first resistor and a positive terminal of the fifth resistor is connected to a power supply.

4. The heater control circuit of claim 1, wherein the heater resistor and the third resistor are incorporated in a microelectromechanical system (MEMS) flow sensor chip of the fluid flow sensor.

5. The heater control circuit of claim 1, further comprising a fourth resistor wherein a positive terminal of the fourth resistor is connected to the negative terminal of the heater resistor and a negative terminal of the fourth resistor is connected to a ground.

6. The heater control circuit of claim 5, wherein the resistance of the fourth resistor is greater than 100 times a resistance of the second resistor.

7. The heater control circuit of claim 5, further comprising a third electronic switch wherein a positive terminal of the third electronic switch is connected to the positive terminal of the fourth resistor, a negative terminal of the third electronic switch is connected to the negative terminal of the fourth resistor, wherein the third electronic switch is configured open when the third switch is operated in the calibration mode and wherein the third electronic switch is configured closed when the third switch is operated in the flow sensing mode.

8. A fluid flow sensor, comprising:
a microelectromechanical system (MEMS) semiconductor chip comprising:
an upstream flow sensor resistor;
a downstream flow sensor resistor; and
a heater resistor disposed between the upstream flow sensor resistor and the downstream flow sensor resistor, and a heater control circuit, comprising:
a first resistor;
a trimmable resistor;
a second resistor;
a third resistor,
wherein
a positive terminal of the first resistor is connected to a positive terminal of the trimmable resistor,
a negative terminal of the first resistor is connected to a positive terminal of the heater resistor,
a negative terminal of the trimmable resistor is connected to a positive terminal of the second resistor,
a negative terminal of the second resistor is connected to a positive terminal of the third resistor, and
a negative terminal of the heater resistor is connected to a negative terminal of the third resistor;
a first electronic switch comprising a positive terminal of the first electronic switch is connected to the positive terminal of the second resistor and a negative terminal of the first electronic switch is connected to the negative terminal of the second resistor, wherein the first electronic switch is configured closed and provides a short circuit bypassing the second resistor when the heater control circuit is operated in a calibration mode and wherein the first electronic switch is configured open when the first electronic switch is operated in a flow sensing mode.

9. The fluid flow sensor of claim 8, wherein the trimmable resistor is a digital potentiometer.

10. The fluid flow sensor of claim 8, wherein the trimmable resistor is a thin film resistor and is laser trimmable.

11. The fluid flow sensor of claim 8, wherein the upstream flow sensor resistor comprises a first upstream resistor and a second upstream resistor and the downstream flow sensor resistor comprises a first downstream resistor and a second downstream resistor, wherein a positive terminal of the second downstream resistor is connected to a power supply and a negative terminal of the second downstream resistor is connected to a first flow sense output of the fluid flow sensor, wherein a positive terminal of the first upstream resistor is connected to the first flow sense output, wherein a positive terminal of the second upstream resistor is connected to the positive terminal of the second downstream resistor and a negative terminal of the second upstream resistor is connected to a second flow sense output of the fluid flow sensor, wherein a positive terminal of the first downstream resistor is connected to the second flow sense output and a negative terminal of the first downstream resistor is connected to a negative terminal of the first upstream resistor, and wherein the negative terminal of the first downstream resistor is coupled to ground.

12. The fluid flow sensor of claim 11, wherein the second downstream resistor and the first upstream resistor comprise a first leg of a sensor Wheatstone bridge, the second upstream resistor and the first downstream resistor comprise a second leg of the sensor Wheatstone bridge, a first output of the sensor Wheatstone bridge is the first flow sense output, a second output of the sensor Wheatstone bridge is the second flow sense output, and further comprising a sensor Wheatstone bridge stabilization resistor, wherein the negative terminal of the first downstream resistor is connected to a positive terminal of the sensor Wheatstone bridge stabilization resistor and a negative terminal of the sensor Wheatstone bridge stabilization resistor is connected to ground.

13. The fluid flow sensor of claim 8, further comprising:

a second electronic switch wherein a positive terminal of the second electronic switch is connected to the positive terminal of the first resistor; and an operational amplifier, wherein a negative input terminal of the operational amplifier is connected to the negative terminal of the first resistor, wherein a positive input terminal of the operational amplifier is connected to the negative terminal of the trimmable resistor, and wherein an output terminal of the operational amplifier is connected to the negative terminal of the second electronic switch, wherein the second electronic switch is configured open and neutralizes the operational amplifier when the heater control circuit is operated in the calibration mode and wherein the second electronic switch is configured closed when the heater control circuit is operated in a flow sensing mode.

14. The fluid flow sensor of claim 13, further comprising a fourth resistor wherein a positive terminal of the fourth resistor is connected to the negative terminal of the heater resistor and a negative terminal of the fourth resistor is connected to a ground.

15. The fluid flow sensor of claim 14, wherein the resistance of the fourth resistor is greater than 100 times a resistance of the second resistor.

16. The fluid flow sensor of claim 14, further comprising a third electronic switch wherein a positive terminal of the third electronic switch is connected to the positive terminal of the fourth resistor, a negative terminal of the third electronic switch is connected to the negative terminal of the fourth resistor, wherein the third electronic switch is configured open when the third switch is operated in the calibration mode and wherein the third electronic switch is configured closed when the third switch is operated in the flow sensing mode.

17. The fluid flow sensor of claim 16, further comprising a fifth resistor wherein a negative terminal of the fifth resistor is connected to the positive terminal of the first resistor and a positive terminal of the fifth resistor is connected to a power supply.

* * * * *